United States Patent [19]

Hirsh

[11] Patent Number: 5,151,873
[45] Date of Patent: Sep. 29, 1992

[54] CALCULATOR WITH MUSIC GENERATING DEVICE

[76] Inventor: John R. Hirsh, 5162 Cheswick Dr., Solon, Ohio 44139

[21] Appl. No.: 583,859

[22] Filed: Sep. 17, 1990

[51] Int. Cl.$^5$ .............................................. G06F 3/00
[52] U.S. Cl. .................................................. 364/710.12
[58] Field of Search ................. 364/710.01, 710.12, 364/705.01, 708; 84/647; 235/58 CF; 381/51

[56] References Cited

U.S. PATENT DOCUMENTS

| | | | |
|---|---|---|---|
| 4,352,313 | 10/1982 | Ny | 84/425 |
| 4,398,086 | 8/1983 | Smith, III | 235/145 R |
| 4,452,119 | 6/1984 | Tanimoto | 364/710.12 |
| 4,491,049 | 1/1985 | Mizuta et al. | 364/710.12 |
| 4,519,044 | 5/1985 | Munetsugu | 364/710.12 |
| 4,582,984 | 4/1986 | Peterpaul et al. | 235/58 CF |
| 4,704,940 | 11/1987 | Cummings | 84/425 |
| 4,797,538 | 1/1989 | Schick | 235/1 D |
| 4,808,800 | 2/1989 | Nishijima et al. | 235/58 CF |

Primary Examiner—Long T. Nguyen
Attorney, Agent, or Firm—Calfee, Halter & Griswold

[57] ABSTRACT

An apparatus having a calculating mode and a music generating mode and which is adapted to be selectively disposed in either the calculating or the music generating modes. The apparatus has a housing and a keyboard layout which simulates the housing and keyboard layout of an electronic desk-top calculator. The keys on the keyboard are assigned numerical and functional designations comparable to those found in a desk-top calculator, and additional designations symbolizing the musical notes generated by depressing the keys. Each key can perform the numerical or functional operation, or generate the musical note, associated with its respective designations. Thus, a musical score can be correlated to the numerical and function keys of the desk-top electronic calculator, and a person who is able to operate a desk-top electronic calculator by "touch" will be able immediately to play music by "touch", rather than by hunt-and-peck techniques.

22 Claims, 5 Drawing Sheets

CALCULATOR WITH MUSIC GENERATING DEVICE

TECHNICAL FIELD

The present invention relates to an apparatus having both a calculating function and a music generating function. In particular, the invention relates to an apparatus with a keyboard which simulates the keyboard of a desk-top electronic calculator but which, in addition to performing the calculating functions associated with an electronic calculator, is capable of generating musical notes by actuation of selected keys on the keyboard.

BACKGROUND

The broad concept of a device that can function as a calculator and a musical device is known. For example, U.S. Pat. No. 4,352,313 shows a piano-type keyboard fastened to a standard alpha-numeric computer keyboard. The keys on the piano-type keyboard are in contact with the keys on the computer keyboard to generate musical notes. When a user depresses a key on the piano-type keyboard, a key on the computer keyboard is also depressed, and a musical note is produced.

Another known device with calculating and music generating capabilities is a typical hand-held calculator having numerical keys which are also designed to generate a limited selection of musical notes. However, such a device has small and tightly-spaced keys on the keyboard. Thus, it is difficult to play the keyboard by "touch". It is also difficult to play notes at any speed without accidentally hitting unwanted notes. Moreover, when such a device is laid on a support surface, the keyboard would be disposed in a generally horizontal orientation a short distance about the support surface. Such an orientation would be uncomfortable to play for any appreciable period of time.

Applicant believes that a combined calculating and musical device with a keyboard which simulates the keyboard of a desk-top electronic ten-key calculator has advantages over the foregoing types of devices. Specifically, a desk top electronic calculator, when resting on a surface such as a desk top, has a keyboard housing which is spaced from and angled upwardly relative to the surface upon which the calculator rests. The geometry of the keyboard, and the arrangement of numerical and function keys thereon, are designed to allow a user to comfortably and rapidly enter data and commands over long periods of time by "touch" (rather than "hunt-and-peck") techniques For example, the contact surfaces of the keys are spaced far enough apart to correspond with the natural, relaxed spacing of a user's fingers, thereby minimizing strain on the fingers and the risk that more than one key may be inadvertently hit at one time. Moreover, when the device is resting on a surface, the angled keyboard permits a user to rest a forearm on the surface while actuating the keys, thereby enabling the user to comfortably actuate the keys over long periods of time. Such features facilitate rapid entry of data or commands into the calculator, over long periods of time.

Applicant believes the foregoing features of a desk, top electronic calculator keyboard make it particularly suited for use as a music generating device. For example, the design of the keyboard permits a user comfortably to enter key strokes over significant periods of time without becoming tired or cramped. Also, the spacing of the keys is such that a user can comfortably and selectively actuate single or multiple keys. Additionally, for those who are or become skilled at operating a desk-top electronic calculator keys by "touch", a musical score written in terms of the layout of the keys of an electronic calculator keyboard enables music to be played almost instantaneously, by "touch", rather than hunt-and-peck techniques.

In contrast, a typical hand-held calculator, while having one advantage over the desk-top calculator in that it is small and portable, has the disadvantage in that it is generally not as comfortable or as easy to enter keystrokes on the keyboard. The typical hand-held calculator has keys that are usually small and tightly-spaced, and a keyboard that is not angled from the support surface. For example, a typical hand-held calculator has key contact surfaces that are spaced less than 3/16" apart. When the calculator is resting on a surface, the keyboard is angled at less than five degrees with respect to the surface. On the other hand, the desk-top electronic ten-key calculator has key contact surfaces that are spaced at least ¼" apart and has an angle of at least eight degrees with respect to the support surface. The key spacing and angle of the keyboard permit a more comfortable and efficient actuation of the keys than with a typical hand-held calculator. Consequently, the inputting of keystrokes on a desk-top electronic calculator can be a relatively quick and easy process compared to the inputting of keystrokes on a hand-held calculator.

SUMMARY OF THE INVENTION

The present invention provides a combined calculator and music generating device with a housing and keyboard which simulate the housing and keyboard of a desk-top electronic calculator. The device has a calculating mode, a music generating mode, and a switch to select either mode. The keyboard simulates the keyboard layout of an electronic calculator, but functions as the keyboard for both a calculator and for a musical instrument. Thus, the keyboard enables data or music to be generated comfortably, over substantial periods of time. With the device of the invention, one who is skilled at operating an electronic desk-top calculator by "touch" can be instantaneously taught to play the musical instrument by "touch", by means of a musical score with musical note symbols written as electronic calculator numbers and symbols. Further, the arrangement of notes associated with the keyboard layout is such that a user can comfortably and efficiently generate either individual musical notes or musical chords.

The device of the preferred embodiment has a keyboard layout which comprises a primary array of nine keys which are numerical keys for the device in its calculating mode. Function keys are located to the right and left of the primary array of keys. Also, additional numerical and function keys are disposed below the primary array of keys. The contact surfaces of the keys of the primary array are spaced at least ¼" apart from each other to conform generally to the natural, relaxed position of a typical user's fingers. Further, the keys of the primary array have contact surfaces approximately ½" in width and ½" in length, to provide a comfortable area of contact of a typical user's finger. Certain of the numerical and/or function keys, other than the primary array, have contact surfaces which are substantially larger than the contact surfaces of the primary keys, because they are located to be easily and comfortably engaged by the thumb, or the edge of the palm of a user's hand. The arrangement and the dimensions of the keys are designed to enable both rapid and comfortable entry of data or commands or generation of musical notes or chords, over significant periods of time.

The design of the keyboard is such that the hand need not move substantially in any direction to enter commands, data, or musical notes on the keyboard. Further, the keyboard is designed to be used for long periods of time without the user's hands becoming tired or cramped. Consequently, the device is particularly suited for situations which require the rapid entry of data or commands, or comfortable generation of musical notes or chords, over significant periods of time.

Further, the design of the keyboard makes the device particularly suited to enable a user to be "self-taught+ to operate the device in its music generating modes. For example, a user who can operate a desk-top electronic calculator keyboard by "touch" can be immediately "self-taught" to play the device as a musical instrument, by providing a musical score coded to the numbers and symbols normally associated with the calculator keys.

The device of the invention is designed so that in its music generating mode it is capable of playing chords, and is capable of storing and replaying a selected melody. Moreover the device is designed so that in its calculating mode, it can produce display and printing functions normally found in a desk-top calculator.

Further features of the present invention will become apparent from the following detailed description taken with reference to the accompanying drawings.

DESCRIPTION OF THE PREFERRED EMBODIMENTS

Figure 1:
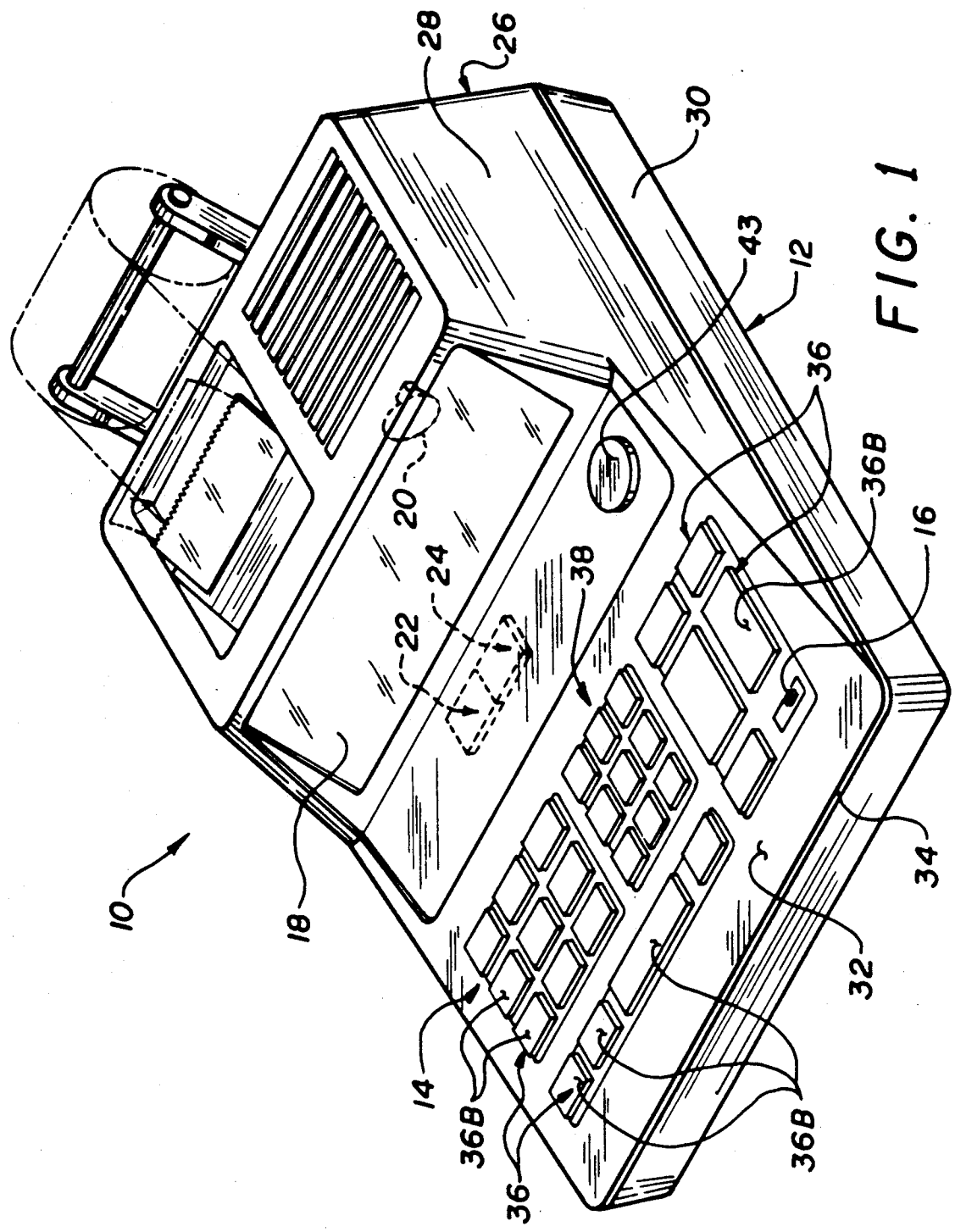
FIG. 1 shows a perspective view of the housing and keyboard layout for a combined calculator and music generating device made in accordance with the principles of the present invention.

FIG. 1 shows the housing and keyboard layout for a combined calculator and music generating device 10 according to the invention. The device comprises a base 12 and a keyboard 14 located on the base 12. The keyboard 14 has an arrangement of keys that are independently actuatable when the device 10 is in a calculating mode and when the device is in a music generating mode.

When the device 10 is in the calculating mode, the device performs various mathematical calculations, normally associated with a desk-top electronic calculator. When the device is in its music generating mode the device generates musical notes or chords. The device 10 includes a switch 16 for selecting the calculating mode or the music generating mode. The device 10 has a display 18 for displaying numbers and calculations when the device 10 is in its calculating mode. The device 10 also has a speaker 20 for amplifying the musical notes when the device 10 is in its music generating mode.

When the device 10 is in its calculating mode, the device responds to entry of commands or numbers via the keyboard 14. The device has typical internal desk-top calculator structure which converts the commands or numbers into proper mathematical responses and presents such responses on the display 18. The device includes a conventional integrated circuit (represented schematically at 22) which performs the necessary mathematical calculations.

Figure 3:
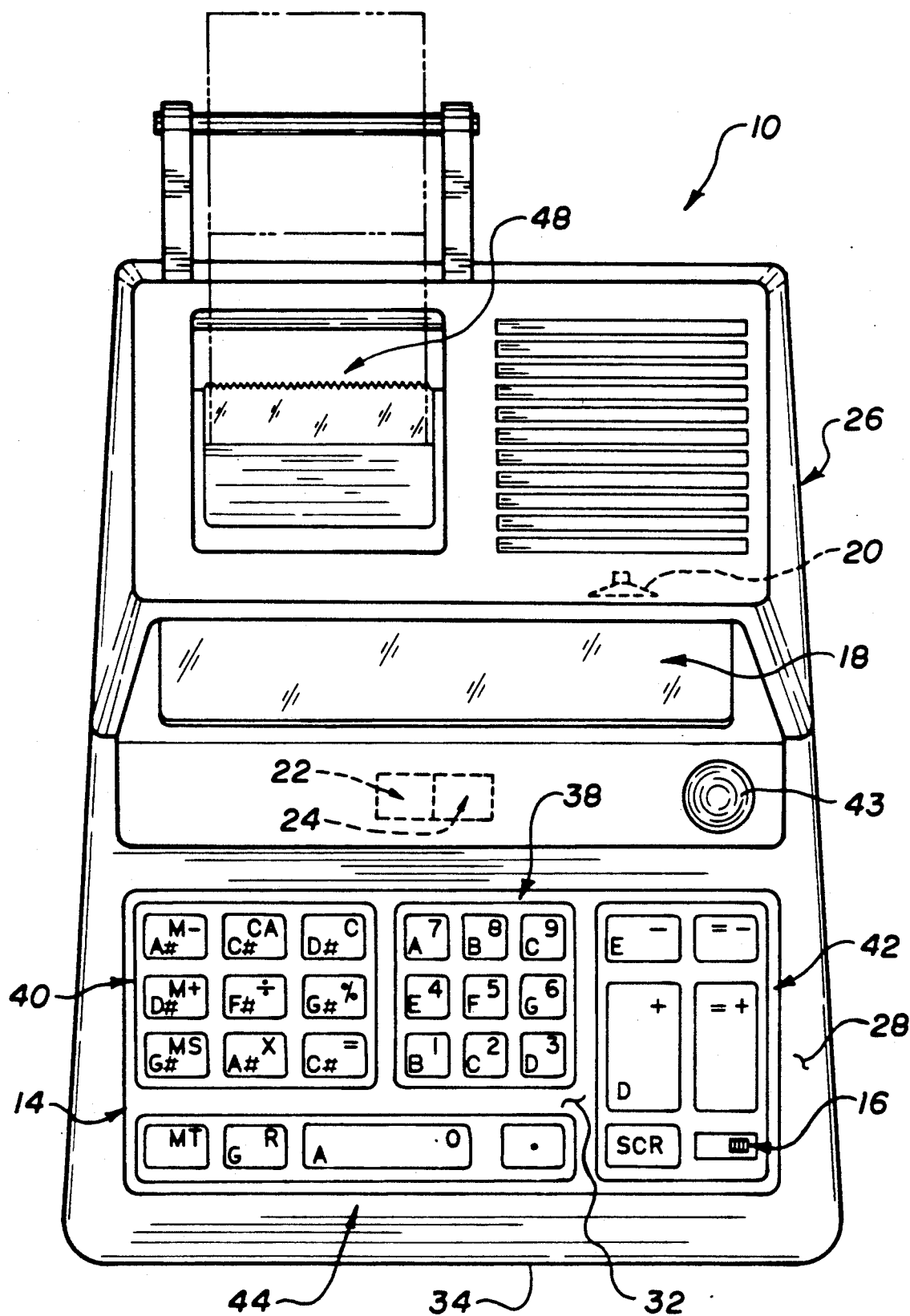
FIG. 3 shows a top view of the device of FIG. 1.

When the music generating mode is selected, the generation of musical notes is also accomplished by the actuation of keys on the keyboard 14. The device 10 converts the keystrokes into musical notes which are reproduced through the speaker 20. The device 10 includes a conventional integrated circuit (represented schematically at 24) which performs the necessary music generating functions. One integrated circuit which can be used with the keyboard layout of FIG. 3 is of the type marketed by TONY, U.S.A., Inc. under the model number 9031. However, it is contemplated that other known types of integrated circuits designed with music generating capabilities can be utilized in accordance with the present invention.

The device 10 has an outer housing 26 which forms part of both the base 12 and the keyboard 14. The housing 26 comprises a top portion 28 and bottom portion 30 formed from a molded plastic material such as PVC. The bottom portion 30 encloses the integrated circuits 22, 24 for performing mathematical calculations, and for generating music. The bottom portion 30 is also adapted to enclose a conventional power supply (not shown). The bottom portion 30 further includes an opening for a power switch and a power cord (not shown). The top portion 28 partially encloses the keyboard 14, the speaker 20 and the components of the display 18.

The speaker 20 is of a conventional design and is in communication with the integrated circuit 24. The speaker 20 responds to signals from the integrated circuit 24 in a known manner to generate the particular note or chord that has been inputted on the keyboard 14. The speaker 20 may also include a conventional earphone jack to be used with an earphone (not shown).

The upper portion 28 of the housing has a generally wedge-shaped configuration having a keyboard surface 32 thereon. The keyboard surface 32 is designed so that when the base 12 is resting on a horizontal surface, the keyboard surface 32 extends at an angle A to the surface (see FIG. 2). Specifically, the keyboard surface 32 has a lower edge 34 disposed at the top of the base 12, and the keyboard surface 32 extends angularly upward from the lower edge 34. The angle A can range anywhere from 8 to 12 degrees, with the preferred angle being approximately 10 degrees. The lower edge 34 of the keyboard is preferably adapted to be spaced at least 1" above the surface upon which the calculator rests.

Figure 2:
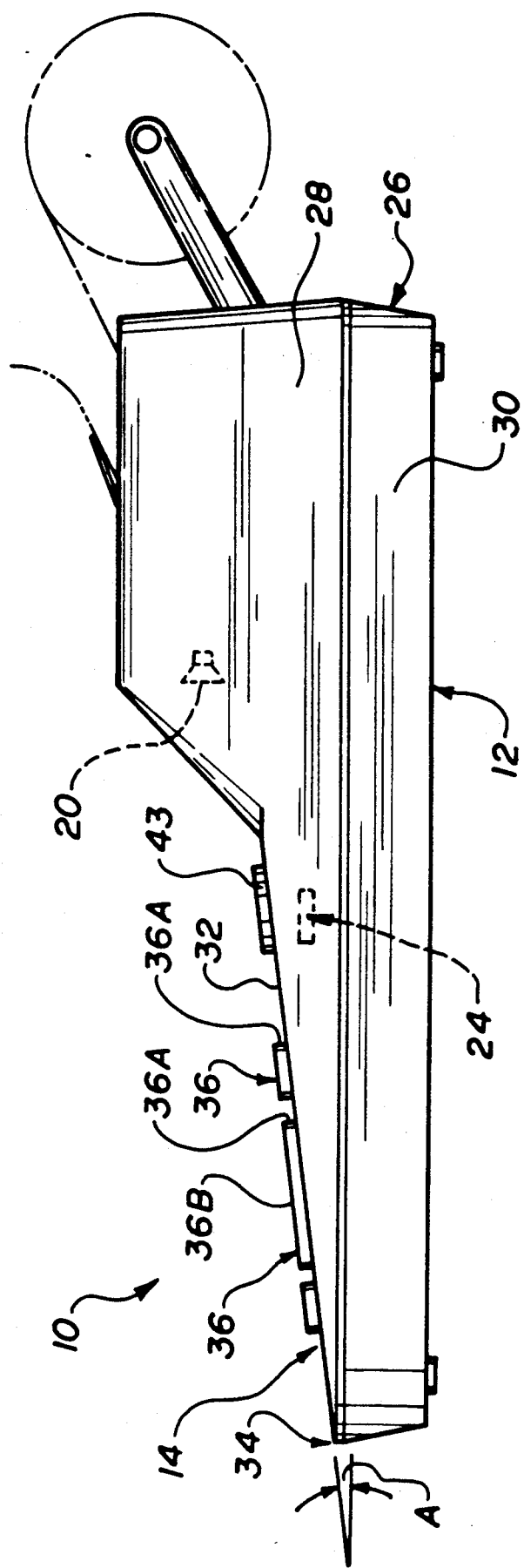
FIG. 2 shows a side view of the device of FIG. 1.

The keyboard 14 consists of a plurality of keys identified generically at 36 in FIGS. 1 and 2. Each of the keys 36 is independently actuatable. In the preferred embodiment, each key 36 has a portion 36A extending outward of the keyboard surface 32, and each portion 36A is oriented perpendicular to the keyboard surface 32 (see FIG. 2). Each key 36 is biased in a known manner to extend above the keyboard surface 32 by about the relative distance schematically illustrated in FIG. 2. Each key 36 can be depressed in order to perform a calculating or data entry function, and each key 36 is returned, under its bias, to the orientation of FIG. 1 when pressure on the key is removed. Each key 36 has a contact surface 36B on the exposed face of the key. The contact surface of each key 36 is spaced at least ¼" apart from the adjoining key's contact surface, which allows the user to strike one key without the risk of overlapping and striking an adjacent key. Furthermore, the contact surface of the smallest of the keys is approximately ¼" in width and ¼" in length to conform to the area of contact of the user's fingers. Consequently, the contact surfaces and key spacings are such that the keys may be independently actuated in a rapid fashion to facilitate the generation of notes, or the entry of data or commands.

The keyboard 14 consists of different arrangements of the keys 36. As shown in FIG. 3, a preferred arrangement of the keys 36 comprises a primary central array 38 of keys, an array 40 of keys to the left of the primary array 38, another array 42 to the right of the primary array 38, and still another array 44 below the primary array 38. The primary array 38 includes nine numerical keys, ranging from 1 to 9. The keys are arranged in horizontal and vertical rows of three keys each, with the numbers increasing from left to right and from bottom to top. The array 44 below the primary array includes a "0" key, a decimal point (.) key and two function keys (MT, R). Other keys, such as a double zero (00), can be included in the bottom array 44 without departing from the scope of the invention.

The arrays 40, 42 to the left and right of the primary array 38 include respective sets of function keys. The function keys produce the typical calculations such as addition (+), subtraction (−), multiplication (×). division (:) and total (=), as well as more advanced calculations, such as percentages (%). The function keys also provide memory keys (MT), (MS), (M+), (M−), and clear keys (C), (CA). Additionally, the keyboard 14 may contain a switch (such as a rotary switch 43) which controls the position of the decimal point when the device is functioning as a calculator.

As seen in FIG. 3, the keys of the primary array 38 have the smallest contact surfaces, and certain of the other keys have larger contact surfaces. The (+) and (=+) keys of the right array 42 and the (0) key of the bottom array 44 are substantially larger than the keys of the primary array 38 or of any of the other keys. The (+) and (+=) keys are large enough so that they can be comfortably depressed by the edge of a user's palm. The (0) key is large enough to be conveniently depressed by a user's thumb.

The foregoing layout of keys are designed to simulate the layout of keys for an electronic desk-top calculator marketed by the Singer Company, Business Machine Division, Albuquerque, N.M., under the trademark FRIDEN, model number 1212. The integrated circuit 22 for the calculator mode is preferably the integrated circuit for the same model desk-top electronic calculator. However, it is contemplated that the keyboard layout and the integrated circuit associated therewith can simulate other desk-top electronic calculators.

When the calculating mode is selected, actuation of keys on the keyboard 14 produces a mathematical response from the calculator. As can be appreciated by those familiar with the art, the actuation of a selected key inputs a command or data into the calculator. The calculator then performs the selected mathematical function and presents the proper mathematical response on the display 18. The user must hit each key independently for the calculator to recognize the correct input command or data. If the user depresses more than one key simultaneously, the calculator will not recognize the inputted command or data, and the display will either remain inactive or will present an error message.

When the music generating mode is selected, the device generates musical notes or chords. When a particular key is depressed, the device generates a note instead of producing a mathematical response. For example, in the embodiment of FIG. 3, the following keystrokes produce the following musical notes:

| Key | Note | Key | Note |
|-----|------|-----|------|
| R | G | MS | G sharp |
| 0 | A | X | A sharp |
| 1 | B | =(or sum) | C sharp |
| 2 | C | M+ | D sharp |
| 3 | D | : | F sharp |
| 4 | E | % | G sharp |
| 5 | F | M− | A sharp |
| 6 | G | Clear All | C sharp |
| 7 | A | Clear | D sharp |
| 8 | B | | |
| 9 | C | | |
| + | D | | |
| − | E | | |

Each key is connected to the portion of the integrated circuit 24 which produces the electrical signal associated with the respective musical note for the key. As can be appreciated, the same keys are associated with both the calculating mode and the music generating mode. The keyboard layout of FIG. 3 is believed to be particularly well suited for generating individual notes.

Figure 4:
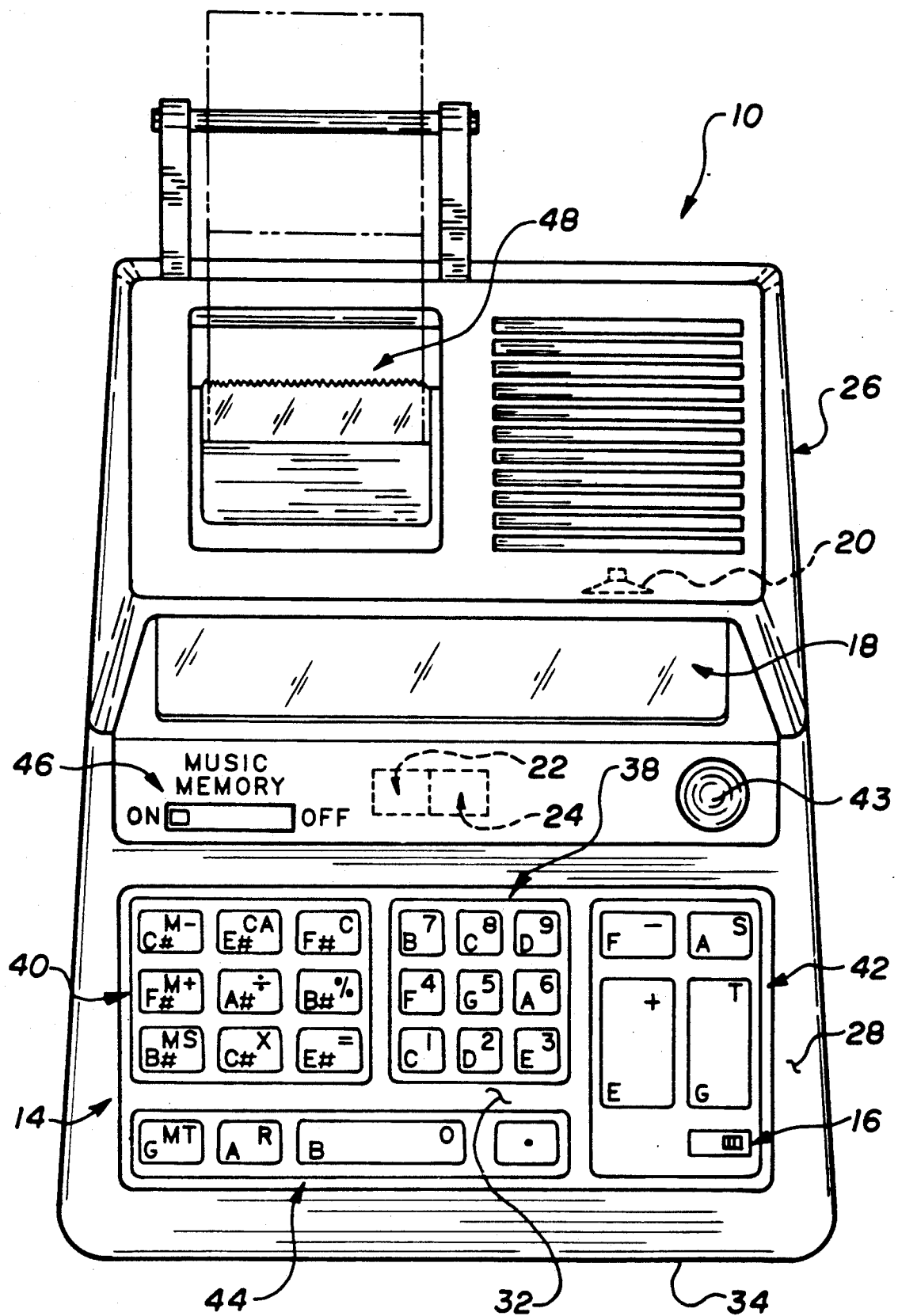
FIG. 4 shows a top view of a modified calculator and a music generating device according to the present invention.

In a modified form of the keyboard of the invention, as shown generally in FIG. 4, the following keystrokes produce the following musical notes:

| Key | Note | Key | Note Key |
|-----|------|-----|----------|
| R | A | MS | B sharp |
| 0 | B | X | C sharp |
| 1 | C | =(or sum) | E sharp |
| 2 | D | M+ | F sharp |
| 3 | E | : | A sharp |
| 4 | F | % | B sharp |
| 5 | G | M− | C sharp |
| 6 | A | Clear All | E sharp |
| 7 | B | Clear | F sharp |
| 8 | C | | |
| 9 | D | | |
| + | E | | |
| − | F | | |
| S(or sum) | A | | |
| T | G | | |

The arrangement of notes and keys on the keyboard of FIG. 4 facilitate the generation of a combination of musical notes, or chords. Also, the calculator structure associated with the embodiment of FIG. 4 would be the same as that disclosed for the embodiment of FIG. 3.

Figure 5:
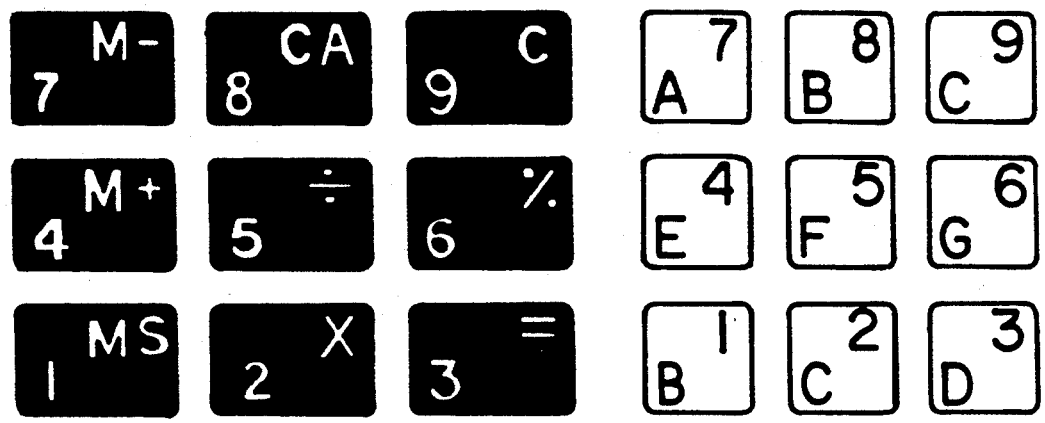
FIG. 5 schematically illustrates a portion of the keyboard of the calculator and music generating device of FIG. 4, and showing a modification of that keyboard portion.

FIG. 5 illustrates a further modification of the device of FIG. 4. The modified portion of the keyboard carries the sharp keys. It could also carry certain flat keys. In any event, the part of the keyboard having the sharp or flat keys can have keys which are colored black and which have white written material thereon. Moreover, as illustrated in FIG. 5, rather than identification of musical notes, the sharp (or flat) keys can carry numbers which correspond to a musical score written for such a keyboard.

When the music generating mode is selected, the device 10 permits the generation of musical chords, or combination of notes, by pressing more than one key at a time. The integrated circuit 24 for generating the musical notes, or chords, is preferably the same internal circuitry found in the Casio Electronic Keyboard Model PT 100. Up to three keys may be simultaneously pressed to create a specific chord. Consequently, either one note, or a combination of notes may be generated by the device 10 with the keyboard layout of FIG. 4.

The device 10 of either embodiment, when in its calculating mode, is capable of storing mathematical data and computations, as is well known. The device 10 when in its music generating mode, can also be adapted to store and replay music. For example, the embodiment of FIG. 4 has a memory key 46 which, when actuated, enables notes and/or chords to be stored in the calculator memory. When the calculating mode is selected, the memory keys M, MT, MS and MT at actuated to store and retrieve particular results in memory. However, when the music generating mode is selected, the memory key 46 can be selectively actuated to store the particular note or notes, as well as the length of time between each note or chord. The integrated circuit 24 for providing such a memory function is conventional in the art and is found, for example, in an electronic keyboard by Yamaha, model number PSR-6. The memory contains both the particular key and the length of time a key, or group of keys, is depressed. Consequently, when the music generating mode is selected, and the user depresses a memory recall key (not shown), the device will reproduce the particular stored musical note(s) or chord(s) through the speaker 20 for the appropriate length(s) of time. Additionally, when the calculating mode is selected and the user depresses the appropriate memory recall key, the calculator will present the particular stored response on the display 18 and on a printing mechanism (schematically shown at 48), which can be of a conventional electronic calculator type. The user may therefore store mathematical responses, or quantities of music, for later playback.

The keyboard 14 may further include a removable template (not shown), which will aid the user in selecting the proper musical note or notes. The template may be secured over the keyboard 14 and may have designations corresponding to the musical notes produced by the respective keys. Alternately, the individual keys will have the numerical and musical note appearing thereon, as shown generally in FIGS. 3 and 4.

The display 18 for the mathematical responses consists of any conventional display such as a LED (Light Emitting Diode), LCD (Liquid Crystal Display) or analog display. The display 18 may also be in communication with the printing mechanism 48, or may be in communication with an external printer (not shown). When the calculating mode is selected, the display 18 and printing mechanism 48 present the inputted commands or data and the appropriate response. However, when the music generating mode is selected, the display 18 and printing mechanism 48 remain inactive.

To operate the device of either FIG. 3 or 4 in the calculating mode, the switch 16 is set to a first, or calculating, position. The entry of a keystroke on the keyboard 14 enters commands or data into the integrated circuit 22 to perform the functions on the data entered. The device presents the appropriate result on the display 18 and associated printing mechanism 48. To operate the device in the music generating mode, the switch 16 is set to a second, or music generating position. When a keystroke is entered on the keyboard 14, the device produces an individual note, which is reproduced through the speaker 20. With the device of FIG. 4, when a number of keys are simultaneously actuated, the device produces chords, or a combination of notes.

Figure 5A:
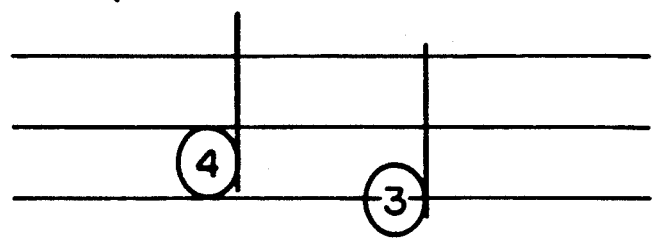
FIG. 5A schematically illustrates one type of musical notes for the keyboard layout.
Figure 5B:
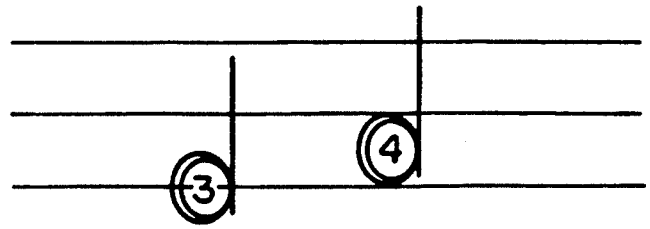
FIG. 5B schematically illustrates a second type of musical notes for the keyboard layout.

A user, being familiar with the arrangement of numerical and function keys on the keyboard, can play notes or songs relatively easily on a device in the music generating mode without extensive practice. For example, in a musical score written for the electronic calculator of the keyboard layout of FIG. 5, the notes in the score represented with a single circle (see e.g., FIG. 5A) represent the keys on the right hand side of the keyboard, and the notes with a double circle (see e.g., FIG. 5B) represent the sharp and/or flat notes on the left hand side of the keyboard. Thus, a user who can operate a desk-top calculator by "touch" can instantly play the music set forth on the musical score, by depressing the keys identified by the calculator numbers and/or function symbols in accordance with a musical score which is correlated to the calculator number keys and to the function (or number) symbols associated with the sharp (or flat) keys. Furthermore, by appropriate setting of the switch 46, the music, or any portion thereof, can be stored in memory for later retrieval by the user.

It is understood that while certain forms of the present invention has been illustrated, it is not to be limited to these specific forms or arrangement of parts herein described and shown. For example, while keys which are raised above the keyboard surface are preferred, it is believed the principles of the invention can be practiced with keys whose upper surfaces are formed as a single flexible membrane. With the foregoing disclosure in mind, it is believed that various other variations thereon will become apparent to those of ordinary skill in the art.

What is claimed is:

1. Apparatus comprising a housing having calculating means and music generating means therein and a keyboard attached thereto;
    said housing and keyboard simulating the housing and keyboard layout of a desk-top electronic calculator, and said housing being adapted to rest on a surface;
    said keyboard having a plurality of numerical keys and function keys attached to said calculating means for actuating said calculating means; and
    each of said plurality of numerical and function keys being selectively actuatable to cause said music generating means to generate a respective musical note, said numerical and function keys corresponding to the following musical notes:

| Key | Note | Key | Note |
| --- | --- | --- | --- |
| R | A | MS | B sharp |
| 0 | B | X | C sharp |
| 1 | C | = | E sharp |
| 2 | D | M+ | F sharp |
| 3 | E |  | A sharp |
| 4 | F | % | B sharp |
| 5 | G | M− | C sharp |
| 6 | A | Clear All | E sharp |
| 7 | B | Clear | F sharp |

-continued

| Key | Note | Key | Note |
|-----|------|-----|------|
| 8 | C | | |
| 9 | D | | |
| + | E | | |
| − | F | | |
| S | A | | |
| T | G | | |

2. Apparatus as set forth in claim 1 wherein said plurality of numerical and function keys are disposed on a section of said housing which is spaced from and extends at an angle to the surface when the housing is resting on the surface; and
   each of the plurality of keys has a contact surface that is spaced at least ¼ inch apart from an adjoining key's contact surface.

3. An apparatus as in claim 2, further including a switch for selectively actuating either of said calculating means or said music generating means.

4. An apparatus as in claim 3, wherein said calculating means includes a display and a printing mechanism.

5. Apparatus as in claim 4, in which said angle between said housing and said surface is between about 8° and 12°.

6. Apparatus as in claim 5, wherein said angle is about 10°.

7. Apparatus as in claim 1, wherein said keyboard includes a central primary array of numerical keys, and auxiliary sets of numerical and function keys to the left and right of the primary array on the keyboard.

8. Apparatus as in claim 7, in which said primary array of numerical keys comprises three rows and three columns, each row and each column comprising three keys.

9. Apparatus as in claim 8, in which a plurality of said numerical and function keys may be actuated simultaneously to generate a chord.

10. Apparatus as in claim 9, wherein each of said keys has a contact surface which is at least one-half inch in length and at least one-half inch in width.

11. Apparatus as in claim 1, wherein said calculating means and music generating means further includes memory means for storing and selectively retrieving signals corresponding to musical notes.

12. Apparatus comprising a housing having calculating means and music generating means therein and a keyboard attached thereto;
   said housing being adapted to rest on a surface;
   said keyboard having a plurality of numeral keys and function keys attached to said calculating means for actuating said calculating means;
   each of said plurality of numerical and function keys being actuatable to cause said music generating means to generate a respective musical note;
   said plurality of numerical and function keys being disposed on a section of said housing which is spaced from and extends at an angle to the surface when the housing is resting on the surface;
   said plurality of numerical and function keys being spaced at least 1 inch from the surface when the housing is resting on the surface; and
   said plurality of numerical and function keys being located to form the numerical and function keys of a conventional desk top calculator.

13. An apparatus as in claim 12 in which each key has a contact surface, said contact surface being at least ½ inch in length and ½ inch in width, and being spaced at least ¼ inch apart from an adjoining key's contact surface.

14. Apparatus comprising a housing having calculating means and music generating means therein and a keyboard attached thereto;
   said housing being adapted to rest on a surface;
   said keyboard having a plurality of numeral keys and function keys attached to said calculating means for actuating said calculating means;
   each of said plurality of numerical and function keys being actuatable to cause said music generating means to generate a respective musical note;
   said plurality of numerical and function keys being disposed on a section of said housing which is spaced from and extends at an angle to the surface when the housing is resting on the surface;
   said plurality of numerical and function keys comprising at least two separate sets of keys each disposed in a square array and a set of function keys;
   at least one of said sets of keys comprising three rows and three columns, each row and each column comprising three keys, said one of said sets of keys having the numerals 1 through 9 thereupon;
   the other of said sets of keys comprising three rows and three columns, each row and each column comprising three keys, each of said other of said sets of keys having a respective function symbol and a numerical symbol thereon, each of said numerical symbols being associated with the respective musical note associated with the key; and
   said plurality of numerical and function keys further including an additional set of function keys comprising a "−" key, an "R" key, a "0" key and a "." key, of the types found on a desk top electronic calculator.

15. An apparatus as in claim 14, further including a switch for selectively actuating either of said calculating means or said music generating means.

16. An apparatus as in claim 15, in which the angle between said housing and said surface is between about 8° and 12°.

17. An apparatus as in claim 16, wherein the angle is about 10°.

18. An apparatus as in claim 17, wherein said music generating means includes a speaker.

19. An apparatus as in claim 18, in which a plurality of said numerical and function keys may be activated simultaneously to generate a chord.

20. An apparatus as in claim 19, wherein said calculating means includes a display and a printing mechanism.

21. An apparatus as in claim 20 in which each key has a contact surface, said contact surface being at least ½ inch in width and ½ inch in length, and being spaced at least ¼ inch apart from an adjoining key's contact surface.

22. Apparatus comprising a housing having calculating means and music generating means therein and a keyboard attached thereto;
   said housing and keyboard simulating the housing and keyboard layout of a desk-top electronic calculator, and said housing being adapted to rest on a surface;
   said keyboard having a plurality of numerical keys and function keys attached to said calculating means for actuating said calculating means; and
   each of said plurality of numerical and function keys being selectively actuatable to cause said music generating means to generate a respective musical note, wherein said numerical and function keys correspond to the following musical notes:

| Key | Note | Key | Note |
|---|---|---|---|
| R | G | MS | G sharp |
| 0 | A | X | A sharp |
| 1 | B | = | C sharp |
| 2 | C | M+ | D sharp |

-continued

| Key | Note | Key | Note |
|---|---|---|---|
| 3 | D | : | F sharp |
| 4 | E | % | G sharp |
| 5 | F | M− | A sharp |
| 6 | G | Clear All | C sharp |
| 7 | A | Clear | D sharp |
| 8 | B | | |
| 9 | C | | |
| + | D | | |
| − | E. | | |

* * * * *

UNITED STATES PATENT AND TRADEMARK OFFICE
CERTIFICATE OF CORRECTION

PATENT NO. : 5,151,873

DATED : September 29, 1992

INVENTOR(S) : John R. Hirsh

It is certified that error appears in the above-identified patent and that said Letters Patent is hereby corrected as shown below:

Column 10, line 33 after "a '-' key," insert --a "+" key,--

Signed and Sealed this

Twenty-first Day of September, 1993

Attest:

BRUCE LEHMAN

Attesting Officer     Commissioner of Patents and Trademarks